United States Patent
Tong et al.

(10) Patent No.: US 8,339,119 B2
(45) Date of Patent: Dec. 25, 2012

(54) OUTPUT VOLTAGE ADJUSTMENT CIRCUIT FOR BUCK CIRCUITS

(75) Inventors: Song-Lin Tong, Guangdong (CN);
Ya-Jun Pan, Guangdong (CN);
Chien-Sen Hsu, New Taipei (TW);
Qi-Yan Luo, Guangdong (CN); Peng Chen, Guangdong (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 139 days.

(21) Appl. No.: 13/073,980

(22) Filed: Mar. 28, 2011

(65) Prior Publication Data
US 2012/0146615 A1    Jun. 14, 2012

(30) Foreign Application Priority Data
Dec. 8, 2010 (CN) .......................... 2010 1 0579165

(51) Int. Cl.
*H02M 3/157* (2006.01)
(52) U.S. Cl. ........................................................ 323/351
(58) Field of Classification Search ................. 323/222, 323/224, 282–285, 351
See application file for complete search history.

(56) References Cited

U.S. PATENT DOCUMENTS

| | | | |
|---|---|---|---|
| 7,023,672 B2 * | 4/2006 | Goodfellow et al. | 361/18 |
| 7,701,189 B2 * | 4/2010 | Gehrke | 323/285 |
| 7,888,925 B2 * | 2/2011 | Dequina | 323/284 |
| 7,906,948 B2 * | 3/2011 | Qiu et al. | 323/282 |
| 2010/0026269 A1 * | 2/2010 | Zhiang | 323/298 |
| 2011/0163731 A1 * | 7/2011 | Qiu et al. | 323/271 |
| 2012/0153925 A1 * | 6/2012 | Feng et al. | 323/304 |

* cited by examiner

*Primary Examiner* — Adolf Berhane
(74) *Attorney, Agent, or Firm* — Altis Law Group, Inc.

(57) ABSTRACT

An output voltage adjustment circuit for buck circuits includes a microcontroller, first to eighth keys, and a display unit. The first to eighth keys input voltage adjustment signals to the microcontroller. A first input pin of the microcontroller is connected to a voltage output terminal. A second resistor is connected between the first input pin of the microcontroller and ground. A first to a sixth input/output pin of the microcontroller are connected to the display unit. A first to an eighth output pin of the microcontroller are connected to a pulse width modulation (PWM) controller. The first to eighth keys are selectively activated to provide voltage adjustment signals to the microcontroller, sampling output voltages of the voltage output terminal, comparing with a predetermined voltage, controlling the PWM controller to fine tune the duty cycle to output a stable voltage from the voltage output terminal. The display unit displays the voltages on the voltage output terminal.

5 Claims, 2 Drawing Sheets

OUTPUT VOLTAGE ADJUSTMENT CIRCUIT FOR BUCK CIRCUITS

BACKGROUND

1. Technical Field

The present disclosure relates to a buck circuit, and particularly to an output voltage adjustment circuit for buck circuits.

2. Description of Related Art

Conventional buck circuits output voltages in response to the control of a PWM (pulse width modulation) controller, wherein the PWM controller is enabled by output control signals from a CPU disposed on a computer motherboard. However, the output voltages of conventional buck circuits are not stable when buck circuits need to output different stable voltages to perform tests during the design and testing of a computer motherboard. Consequently, conventional buck circuits cannot meet the needs of output voltages, and the CPU disposed on the motherboard is susceptible to damage during the testing process.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
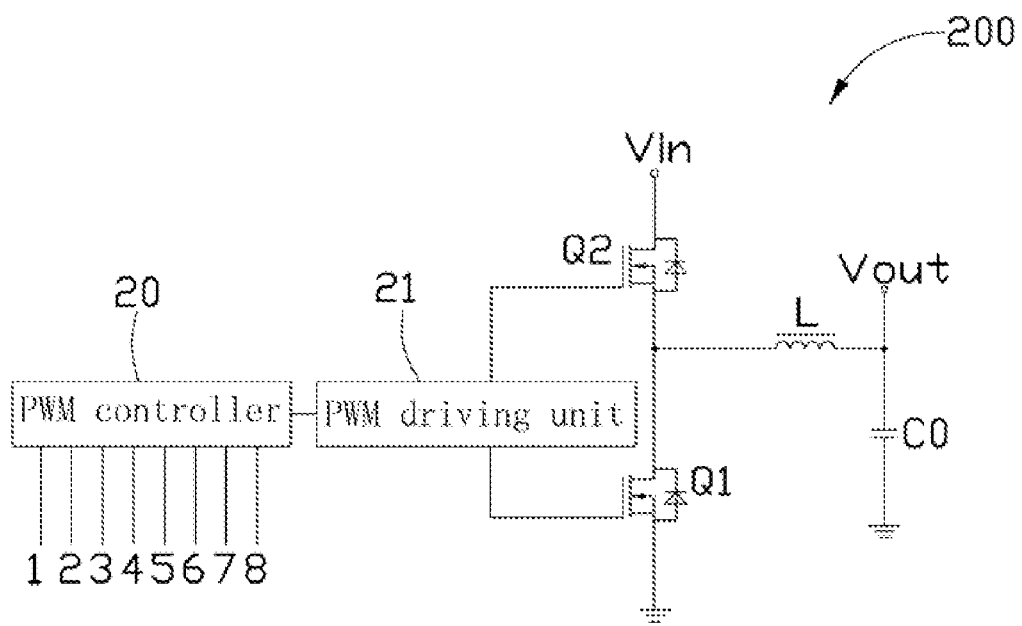
FIG. 1 is a circuit diagram of a buck circuit connected to an output voltage adjustment circuit for buck circuits of the present disclosure.
Figure 2:
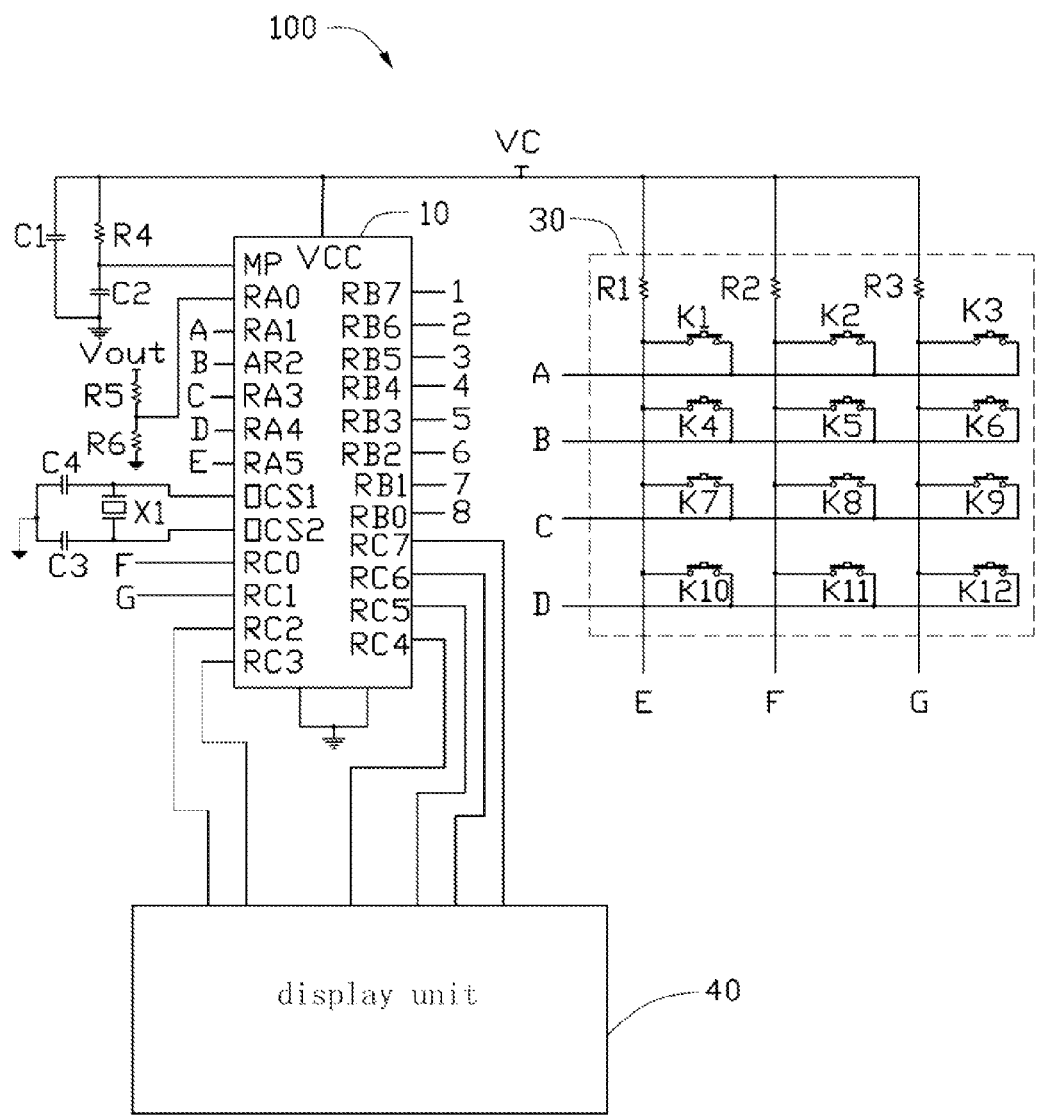
FIG. 2 is a circuit diagram of a preferred embodiment of an output voltage adjustment circuit for buck circuits of the present disclosure.

As shown in FIG. 1 and FIG. 2, an output voltage adjustment circuit 100 for buck circuits of the present disclosure is utilized to adjust the output voltages of a buck circuit 200. The buck circuit 200, disposed on a circuit board (not shown) includes a PWM controller 20, a PWM driving unit 21, field effect transistors Q1 and Q2, a voltage input terminal Vin and a voltage output terminal Vout. The PWM controller 20 is connected to the output voltage adjustment circuit 100. The PWM driving unit 21 is connected to the PWM controller 20 and the gate of the field effect transistors Q1 and Q2 for receiving the control signals output by the PWM controller 20 and providing low potential driving signals and high potential driving signals to the field effect transistors Q1 and Q2 to turn the field effect transistors Q1 and Q2 on and off, respectively. The drain of the field effect transistors Q2 is connected to the voltage input terminal Vin. The source of the field effect transistors Q1 is connected to ground, and the drain of the field effect transistors Q1 is connected to the source of the field effect transistors Q2. The node between the drain of the field effect transistors Q1 and the source of the field effect transistor Q2 is connected to one terminal of the inductance L and the other terminal of the inductor L is connected one terminal of a capacitor C0. The other terminal of the capacitor C0 is grounded. The voltage output terminal Vout is connected between the inductance L and the capacitor C0, so as to output a driving voltage to other components and connect to the output voltage adjustment circuit 100.

A preferred embodiment of the output voltage adjustment circuit 100 includes a microcontroller 10, resistors R4-R6, capacitors C1-C4, a quartz oscillator X1, a key unit 30, and a display unit 40. The key unit 30 includes keys K1-K12 and resistors R1-R3. The keys K1-K12 are arranged in a 4 by 3 array, wherein the keys K1-K8 are utilized to input voltage adjustment signals to the microcontroller 10, the keys K10-K12 are functional keys 'enter', 'cancel', and 'start', respectively. The key K9 is idle.

An input pin RA0 of the microcontroller 10 is connected to the voltage output terminal Vout of the buck circuit 200 through the resistor R5. The resistor R6 is connected in series between the input pin RA0 of the microcontroller 10 and ground. The clock pin OCS1 of the micro controller 10 is connected to ground through a capacitor C4, and the clock pin OCS2 thereof is connected to ground through a capacitor C3. The quartz oscillator X1 is connected in series between the clock pins OCS1 and OCS2 of the microcontroller 10. The input/output pins RC2-RC7 of the microcontroller 10 are connected to the display unit 40. The output pins RB0-RB7 of the microcontroller 10 are connected to the PWM controller 20. A voltage pin VCC of the microcontroller 10 is connected to a voltage source CV and one terminal of the resistor R4. The other terminal of the resistor R4 is connected to one terminal of the capacitor C2 and the other terminal of the capacitor C2 is grounded. A voltage pin MP of the microcontroller 10 is connected to a node between the resistor R1 and the capacitor C2. The capacitor C1 is connected between the voltage pin VCC of the micro controller 10 and ground. An input pin RA5 of the microcontroller 10 is connected to the voltage source VC through the resistor R1, an input pin RC0 thereof is connected to the voltage source VC through the resistor R2, and an input pin RC1 thereof is connected to the voltage source VC through the resistor R3.

First terminals of the keys K1, K2, and K3 are connected to an input pin RA1 of the microcontroller 10. A second terminal of the key K1 is connected to a node between the resistor R1 and the input pin RA5 of the microcontroller 10. A second terminal of the key K2 is connected to a node between the resistor R2 and an input pin RC0 of the microcontroller 10. A second terminal of the third key K3 is connected to a node between the resistor R3 and the input pin RC1 of the microcontroller 10. First terminals of the keys K4, K5 and K6 are connected to an input pin RA2 of the microcontroller 10. A second terminal of the key K4 is connected to a node between a second terminal of the key K1 and the input pin RA5 of the microcontroller 10. A second terminal of the key K5 is connected to a node between a second terminal of the key K2 and an input pin RC0 of the microcontroller 10. A second terminal of the key K6 is connected to a node between a second terminal of the key K3 and the input key RC1 of the microcontroller 10. First terminals of the keys K7, K8, and K9 are connected to an input pin RA3 of the microcontroller 10. A second terminal of the key K7 is connected to a node between a second terminal of the key K4 and an input pin RA5 of the microcontroller 10. A second terminal of the key K8 is connected to a node between a second terminal of the key K5 and an input pin RC0 of the microcontroller 10. A second terminal of the key K9 is connected to a node between a second terminal of the key K6 and the input pin RC1 of the microcontroller 10. First terminals of the keys K10-K12 are connected to the input pin RA4 of the microcontroller 10. A second terminal of the key K10 is connected to a node between a second terminal of the key K7 and the input pin RA5 of the microcontroller 10. A second terminal of the key K11 is connected to a node between a second terminal of the key K8 and the input pin RC0 of the microcontroller 10. A second terminal of the key K12 is connected to a node between a second terminal of the key K9 and the input pin RC1 of the microcontroller 10.

During operation, the computer motherboard is powered on to enable the buck circuit 200 and the output voltage adjustment circuit 100, and the key unit 30 is enabled by the key K12. An 8-bit binary signal is provided to the microcontroller 10 through selective activation of the keys K1-K8. For instance, a 0.8V voltage can be output from the buck circuit by activation of the keys K1-K4 to input a signal '1111'. Concurrently, since the keys K5-K8 are not activated, the microcontroller 10 receives a '0000' signal by default. The key K10 can be activated so that the microcontroller 10 receives a binary signal '11110000' and outputs the received signal to the PWM controller 20. As a result, the PWM controller 20 can drive the PWM driving unit 21 by which the field effect transistors Q1 and Q2 can receive low potential driving signals and high potential driving signals therefrom, adjusting the output voltage of the voltage output terminal Vout. For instance, if the current output voltage is 0.785V, the microcontroller 10 samples the output voltages provided to the microcontroller 10 through the resistors R5 and R6, comparing the output voltages with a predetermined voltage. If the sampled voltage is different from the predetermined voltage, the microcontroller 10 outputs a control signal to direct the PWM controller 20 to tune a duty cycle, so that the voltages output from the voltage output terminal Vout become identical to the predetermined voltage, such as 0.8V. When the duty cycle output by the PWM controller 20 is greater, the voltages output from the buck circuit 200 increase as well. On the contrary, when the duty cycle output by the PWM controller 20 is smaller, the voltages output from the buck circuit 200 decrease as well. The voltages output from the voltage output terminal Vout are shown by the display unit 40. If the voltage output from the voltage output terminal Vout is to be changed to, for instance, 0.6V, the keys K1-K8 have to be reconfigured so that the microcontroller 10 correspondingly samples the voltages output from the voltage output terminal Vout and outputs control signals to direct the PWM controller 20 to fine tune a duty cycle, then a 0.6V voltage is output from the voltage output terminal Vout and shown by the display unit 40. The details of the operations are identical to those described and are omitted. As well, during activation of the keys K1-K8, the key K11 can be activated to cancel the current operation, and the key K12 can be activated to enable the key unit 30.

The output voltage adjustment circuit 100 provides different voltage adjustment signals to the microcontroller 10 through selective activation of the keys of the key unit 30. The microcontroller 10 in turn samples the output voltages from the voltage output terminal Vout, comparing the output voltages to a predetermined voltage, outputting control signals accordingly to direct the PWM controller 20 to fine tune the duty cycle so that the voltage output terminal Vout outputs a stable voltage as required.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An output voltage adjustment circuit for buck circuits comprising:

a microcontroller including a first to a seventh input pin, a first to a sixth input/output pin, and a first to an eighth output pin;

a first and a second resistor, wherein the first input pin of the microcontroller is connected to a voltage output terminal of a buck circuit through the first resistor, the second resistor is connected in series between the first input pin of the microcontroller and ground;

a key unit including first to eighth keys for selectively activated to provide voltage adjustment signals to the microcontroller, sampling output voltages of the voltage output terminal of the buck circuit through the microcontroller, comparing with a predetermined voltage, outputting a control signal accordingly to direct a PWM controller of the buck circuit to fine tune the duty cycle to output stable output voltages from the voltage output terminal of the buck circuit; and a display unit displaying the voltages on the voltage output terminal of the buck circuit;

wherein the first to the sixth input/output pin of the microcontroller are connected to the display unit, the first to the eighth output pin of the microcontroller are connected to the PWM controller, the second to the fourth input pin of the microcontroller are connected to a voltage source; first terminals of the first to the third key of the key unit are connected to the fifth input pin of the microcontroller, a second terminal of the first key of the key unit is connected to a node between the voltage source and the second input pin of the microcontroller, a second terminal of the second key of the key unit is connected to a node between the voltage source and the third input pin of the microcontroller, a second terminal of the third key of the key unit is connected to a node between the voltage source and the fourth input pin of the microcontroller, first terminals of the fourth to the sixth key of the key unit are connected to the sixth input pin of the microcontroller, a second terminal of the fourth key of the key unit is connected to a node between a second terminal of the first key and the second input pin of the microcontroller, a second terminal of the fifth key of the key unit is connected to a node between a second terminal of the second key and a third input pin of the microcontroller, a second terminal of the sixth key of the key unit is connected to a node between a second terminal of the third key and the fourth input key of the microcontroller, first terminals of the seventh and the eighth key of the key unit are connected to a seventh input pin of the microcontroller, a second terminal of the seventh key of the key unit is connected to a node between a second terminal of the fourth key and a second input pin of the microcontroller, a second terminal of the eighth key of the key unit is connected to a node between a second terminal of the fifth key and a third input pin of the microcontroller.

2. The output voltage adjustment circuit for buck circuits of claim 1, wherein the key unit further includes a ninth to a twelfth key, the ninth key is idle, the tenth key is activated to input the voltage adjustment signal to the microcontroller, the eleventh key is activated to cancel the current operation, the twelfth key is activated to enable the key unit, wherein a second terminal of the ninth key is connected to a node between a second terminal of the sixth key and the fourth input pin of the microcontroller, first terminals of the tenth to the twelfth key are connected to the eighth input pin of the microcontroller, a second terminal of the tenth key is connected to a node between the second terminal of the seventh key and the second input pin of the microcontroller, a second terminal of the eleventh key is connected to a node between a second terminal of the eighth key and the third input pin of the microcontroller, a second terminal of the twelfth key is connected to a node between a second terminal of the ninth key and the fourth input pin of the microcontroller.

3. The output voltage adjustment circuit for buck circuits of claim 1, further including a third to a fifth resistor, the third resistor is connected in series between the voltage source and the second terminal of the first key, the fourth resistor is connected in series between the voltage source and the second terminal of the second key, the fifth resistor is connected in series between the voltage source and the second terminal of the third key.

4. The output voltage adjustment circuit for buck circuits of claim 3, further including a sixth resistor, a first capacitor, and a second capacitor, wherein the sixth resistor is connected in series between a first and a second voltage pin of the microcontroller, the first capacitor is connected in series between the first voltage pin of the microcontroller and ground, the second capacitor is connected in series between the second voltage pin of the microcontroller and ground.

5. The output voltage adjustment circuit for buck circuits of claim 4, further including a third capacitor, a fourth capacitor, and a quartz oscillator, wherein the third capacitor is connected in series between a first clock pin of the microcontroller and ground, the fourth capacitor is connected in series between a second clock pin of the microcontroller and ground, the quartz oscillator is connected in series between the first and the second clock pin of the microcontroller.

* * * * *